(12) United States Patent
Becker et al.

(10) Patent No.: US 10,662,498 B2
(45) Date of Patent: May 26, 2020

(54) PRESS-HARDENED SHEET METAL COMPONENT WITH AT LEAST ONE PREDETERMINED BREAKING POINT, AND COMPONENT ASSEMBLY AND MOTOR VEHICLE BODY WITH SUCH A SHEET METAL COMPONENT

(71) Applicant: Bayerische Motoren Werke Aktiengesellschaft, Munich (DE)

(72) Inventors: Juergen Becker, Reichertshofen (DE); Bernd Kupetz, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 248 days.

(21) Appl. No.: 15/591,336

(22) Filed: May 10, 2017

(65) Prior Publication Data

US 2017/0240989 A1    Aug. 24, 2017

Related U.S. Application Data

(63) Continuation of application No. PCT/EP2015/078605, filed on Dec. 4, 2015.

(30) Foreign Application Priority Data

Dec. 19, 2014    (DE) .................. 10 2014 226 542

(51) Int. Cl.
  *C21D 9/46*    (2006.01)
  *B62D 29/00*   (2006.01)
  (Continued)

(52) U.S. Cl.
  CPC ............ *C21D 9/46* (2013.01); *B21D 39/031* (2013.01); *B21D 53/88* (2013.01); *B62D 21/15* (2013.01);
  (Continued)

(58) Field of Classification Search
  None
  See application file for complete search history.

(56) References Cited

U.S. PATENT DOCUMENTS

2006/0097549 A1* 5/2006 Fischer .................. B62D 25/02
                                                  296/203.03
2009/0045638 A1* 2/2009 Handing .................. B60R 19/18
                                                  293/155

(Continued)

FOREIGN PATENT DOCUMENTS

CN    102753422 A    10/2012
CN    103068635 A    4/2013
(Continued)

OTHER PUBLICATIONS

Advanced Materials and Processes, vol. 156, No. 6, Dec. 1999, ASM International, pp. 48-49.*

(Continued)

*Primary Examiner* — George Wyszomierski
(74) *Attorney, Agent, or Firm* — Crowell & Moring LLP

(57) ABSTRACT

A sheet metal component that is made of a press-hardened steel sheet material and is to be used as a vehicle body component for a motor vehicle, is provided. The sheet metal component has at least one overhardened component region which is provided to act as a predetermined breaking point in the event of being subject to a crash load. A component assembly and a motor vehicle body, which have at least one such press-hardened sheet metal component, are also provided.

19 Claims, 1 Drawing Sheet

(51) Int. Cl.
    *B21D 39/03* (2006.01)
    *B21D 53/88* (2006.01)
    *C21D 1/673* (2006.01)
    *B62D 21/15* (2006.01)
    *C21D 1/18* (2006.01)
    *C22C 38/00* (2006.01)
    *C22C 38/04* (2006.01)

(52) U.S. Cl.
    CPC ......... *B62D 21/152* (2013.01); *B62D 29/007* (2013.01); *C21D 1/18* (2013.01); *C21D 1/673* (2013.01); *C22C 38/002* (2013.01); *C22C 38/04* (2013.01)

(56) References Cited

U.S. PATENT DOCUMENTS

| | | | |
|---|---|---|---|
| 2012/0237387 A1* | 9/2012 | Santacreu | C21D 1/09 420/34 |
| 2012/0319432 A1 | 12/2012 | Bodin et al. | |
| 2013/0119683 A1 | 5/2013 | Blümel et al. | |
| 2013/0236239 A1 | 9/2013 | Brandt et al. | |
| 2014/0070552 A1 | 3/2014 | Shimotsu | |
| 2014/0167453 A1 | 6/2014 | Sanders et al. | |
| 2015/0298199 A1 | 10/2015 | Pellmann et al. | |
| 2016/0264182 A1 | 9/2016 | Kirtzakis et al. | |

FOREIGN PATENT DOCUMENTS

| | | |
|---|---|---|
| DE | 10 2009 024 829 A1 | 12/2010 |
| DE | 10 2010 019 258 A1 | 11/2011 |
| DE | 20 2012 000 616 U1 | 4/2012 |
| DE | 10 2011 122 556 B3 | 11/2012 |
| DE | 10 2011 053 698 B3 | 1/2013 |
| DE | 10 2012 201 267 A1 | 8/2013 |
| DE | 10 2012 024 626 A1 | 6/2014 |
| DE | 10 2013 007 805 A1 | 11/2014 |
| EP | 2 025 560 A1 | 2/2009 |
| WO | WO 2011/071433 A1 | 6/2011 |
| WO | WO 2012/016692 A1 | 2/2012 |
| WO | WO-2018/220430 A1 * | 12/2018 |

OTHER PUBLICATIONS

Chinese-language Office Action issued in counterpart Chinese Application No. 201580050512.1 dated Jun. 5, 2018 with English translation (15 pages).

International Search Report (PCT/ISA/210) issued in PCT Application No. PCT/EP2015/078605 dated Feb. 16, 2016 with English-language translation (six (6) pages).

German-language Written Opinion (PCT/ISA/237) issued in PCT Application No. PCT/EP2015/078605 dated Feb. 16, 2016 (five (5) pages).

German Search Report issued in counterpart German Application No. 10 2014 226 542.8 dated Oct. 7, 2015 with partial English-language translation (eleven (11) pages).

* cited by examiner

PRESS-HARDENED SHEET METAL COMPONENT WITH AT LEAST ONE PREDETERMINED BREAKING POINT, AND COMPONENT ASSEMBLY AND MOTOR VEHICLE BODY WITH SUCH A SHEET METAL COMPONENT

CROSS REFERENCE TO RELATED APPLICATIONS

This application is a continuation of PCT International Application No. PCT/EP2015/078605, filed Dec. 4, 2015, which claims priority under 35 U.S.C. § 119 from German Patent Application No. 10 2014 226 542.8, filed Dec. 19, 2014, the entire disclosures of which are herein expressly incorporated by reference.

BACKGROUND AND SUMMARY OF THE INVENTION

The invention relates to a sheet metal component made of a press-hardened steel sheet material or a press-hardened sheet metal component, in particular, to a vehicle body component for a motor vehicle.

The invention further relates to a component assembly comprising several components for a motor vehicle body, and also to a motor vehicle body.

A press-hardened sheet metal component is a sheet metal part made of press-hardened steel sheet material. A press-hardened sheet metal component is therefore a flat component produced by press-hardening or mold-hardening of steel sheet material. For the press-hardening, the steel sheet material is heated to an austenization temperature and is subsequently molded in a press-hardening tool, and in the process is simultaneously rapidly cooled, whereby considerable increases of strength are achieved (for example, tensile strengths of up to 1,300 MPa and more are reached). From the prior art, various methods for press-hardening as well as corresponding devices are known. In a representative fashion, reference is made to the detailed explanations in German Patent Document DE 10 2011 053 698 B3.

However, the high strength of press-hardened sheet metal components is associated with relatively low ductility or elongation at break. Press-hardened sheet metal components therefore tend to break even after a slight deformation in the event of an accident, which rather reduces the amount of collision energy that can be absorbed or reduced by a deformation in the event of an accident or the like. Furthermore, uncontrolled fractures may occur in the case of accident-caused deformations, which may lead to formation of sharp edges and/or open gaps and can thereby pose a considerable risk of injury.

In German Patent Document DE 20 2012 000 616 U1, a structural and/or vehicle body component for a motor vehicle is suggested, which is produced by thermoforming and press-hardening. After the press-hardening, this component has at least two structural regions of varying strength and/or different ductility. A first region of the component essentially has a martensitic structure, and a second region, which has a lower strength and/or higher ductility in comparison with the first region, has an essentially bainitic structure. As a result, it is achieved that, in regions, the component can be designed for individual loads, particularly crash loads. However, the production of such components requires high expenditures and, at times, such components are extremely inefficient.

Concerning the prior art, reference is further made to German Patent Document DE 10 2012 024 626 A1, which suggests a bainitization of the press-molded sheet metal component in a galvanizing bath, and to German Patent Document DE 10 2012 201 267 A1, which suggests an annealing of press-hardened components that follows the press-hardening.

By means of the invention, alternatives are to be created to the measures and approaches known from the prior art.

This and other objects are achieved by a press-hardened sheet metal component and by a component assembly as well as by a motor vehicle body, which has the at least one sheet metal component in accordance with embodiments of the invention.

The press-hardened sheet metal component according to the invention has at least one overhardened component region, which is provided for acting as a predetermined breaking point in the event of a crash-caused load.

An overhardened component region is a region or surface section of the sheet metal component in which the sheet metal material has a clearly higher hardness or strength and a significantly lower ductility than the other regions. In an overhardened component region, the steel sheet material has an essentially pure martensitic structure or a structure with a very high martensitic structure proportion, whereas a mixed structure is present outside the overhardened component region. Such mixed structure, in addition to martensitic structure parts, may also, for example, have bainitic and/or ferritic structure parts.

The sheet metal component according to the invention is the most brittle in an overhardened component region or has the lowest ductility there. In the case of crash loads and resulting crash-caused deformations, the press-hardened sheet metal component according to the invention will tear and/or break first in such an overhardened component region. The press-hardened sheet metal component according to the invention therefore has at least one overhardened component region, which forms or represents a predetermined, i.e. position-predefined breaking point.

The invention therefore takes on a new direction in that, in contrast to the prior art, it is not attempted to avoid tears and/or fractures by increasing ductility, but, in contrast to the previous approach, to permit tears and/or fractures at defined points by a targeted local reduction of ductility (or by embrittlement by means of overhardening). This provides the designer and/or developer with new possibilities for designing crash-relevant vehicle body components and also superior vehicle body structures.

An overhardened component region can be generated when press-hardening or during the press-hardening. For example, the cooling device of the used press-hardening tool in the respective section may be designed for a locally stronger or more intensive cooling, Furthermore, in the concerned tool section, the surface pressure may be locally increased, in order to achieve a better heat transfer. Special tool materials, which permit a good heat conduction, may also be used for the concerned tool section.

In contrast to the approaches so far described in the prior art, which aim at an increase of ductility, a "reverse temperature control" takes place which aims at a reduction of ductility. The at least one overhardened component region can therefore be produced directly during the press-hardening of the previously heated steel sheet material, so that advantageously no additional working step, such as a thermal treatment following the press-hardening, will be required.

In particular, the steel sheet material is a manganese boron steel, such as 16MnB5, 20MnB5 or 22MnB5. The sheet thickness of the steel sheet material is preferably in a range of from 0.5 mm to 6.0 mm, particularly in a range of 0.8 mm to 3.0 mm. The sheet metal component according to the invention preferably has a substantially homogeneous sheet thickness, in which case, by using so-called tailored blanks, the sheet metal component according to the invention may also have an inhomogeneous sheet thickness.

Outside an overhardened component region, the sheet metal material of the sheet metal component according to the invention may have a substantially homogenous strength, which particularly is in a strength range of from 1,300 MPa to 1,500 MPa.

Outside an overhardened component region, the sheet metal material may also have different strengths. This means that the sheet metal component according to the invention, as described in German Patent Document DE 20 2012 000 616 U1, has at least one first component region and at least one second component region with a different strength and/or different ductility (in which case, also at least one unhardened or only slightly hardened region can be provided), as well as also at least one third overhardened component region. A first region may, for example, have strength of from 300 MPa to 500 MPa, and a second region may, for example, have a strength of from 1,300 MPa to 1,500 MPa. In the case of a crash load, a ductile first region has a good deformation behavior, whereas an overhardened third region acts as a predetermined breaking point. The sheet metal component according to the invention may be designed such that, in the case of a crash load, ductile regions are deformed first and, in a time-staggered manner, a tear and/or fracture is created in at least one overhardened region.

In an overhardened component region, the sheet metal material may have a strength which is at least by 100 MPa, preferably at least by 200 MPa, particularly preferably at least by 300 MPa and particularly at least by 400 MPa above the highest sheet metal or material strength outside the overhardened component region. The strength in an overhardened component region may, for example, amount to at least 1,600 MPa, preferably at least 1,700 MPa, particularly preferably at least 1,800 MPa and particularly at least 1,900 MPa. The strength in an overhardened component region may also amount to up to 2,000 MPa and more. Preferably, the high strength in an overhardened component region is homogeneous.

An overhardened component region may extend from an outer edge of the sheet metal component to at least another outer edge of the sheet metal component. An overhardened component region preferably extends in a ribbon-type fashion between two outer edges of the sheet metal component. In the event of a crash load, a tear and/or fracture will occur at the predetermined breaking point between the respective outer edges, which is formed by the overhardening of the sheet metal material, in which case a complete separation may possibly take place. However, a breaking-in-two and/or tearing-in-two is not absolutely necessary.

The press-hardened sheet metal component according to the invention, in particular, is a vehicle body component for a motor vehicle, such as a transverse support, a roof bow, a side skirt, a longitudinal support, an A-pillar or B-pillar, an engine mount, or the like. Particularly preferably, it is a reinforcing or stiffening part for a motor vehicle body, such as a side skirt reinforcement, a longitudinal support reinforcement, a pillar reinforcement, a tunnel reinforcement or the like. However, the press-hardened sheet metal component according to the invention may also be a chassis component.

The component assembly according to the invention has at least one press-hardened sheet metal component according to the invention which, in the event of crash loads can tear and/or break in at least one overhardened component region, in order to thereby deflect or divert collision energy in a targeted manner into other components and particularly into adjacent components of the component assembly. It is preferably provided that at least one other and particularly an adjacent component is designed as an energy absorption element, which can absorb and reduce collision energy by defined deformation (i.e. by deformation with predetermined deformation possibilities).

In the event of an accident, crash energy (impact energy) is therefore diverted in a targeted manner and is, for example, deflected away from vehicle occupants, which is made possible by the tearing and/or breaking of a press-hardened sheet metal component according to the invention in at least one predetermined breaking point predefined by overhardening. In contrast, it is attempted in the prior art to avoid such a tearing and/or breaking and/or reduce collision energy by allowing deformation of the press-hardened sheet metal component.

A component assembly according to the invention is, for example, a composite component formed of several components, (for example, a vehicle body component constructed as a composite component) for a motor vehicle body, as described, for example, in German Patent Document DE 10 2013 007 805 A1. However, a component assembly according to the invention may also be a component of a motor vehicle body or a constructionally integrated vehicle body structure region. Either way, a component assembly according to the invention includes further components which are appropriately joined with the press-hardened sheet metal component according to the invention, and which may, for example, be castings, sheet metal components or sheet metal parts (particularly also with different strengths), profile parts, plastic parts or plastic compound parts (for example, CFC parts, GFRP parts and/or the like. Each of these components may be designed as an energy absorption element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
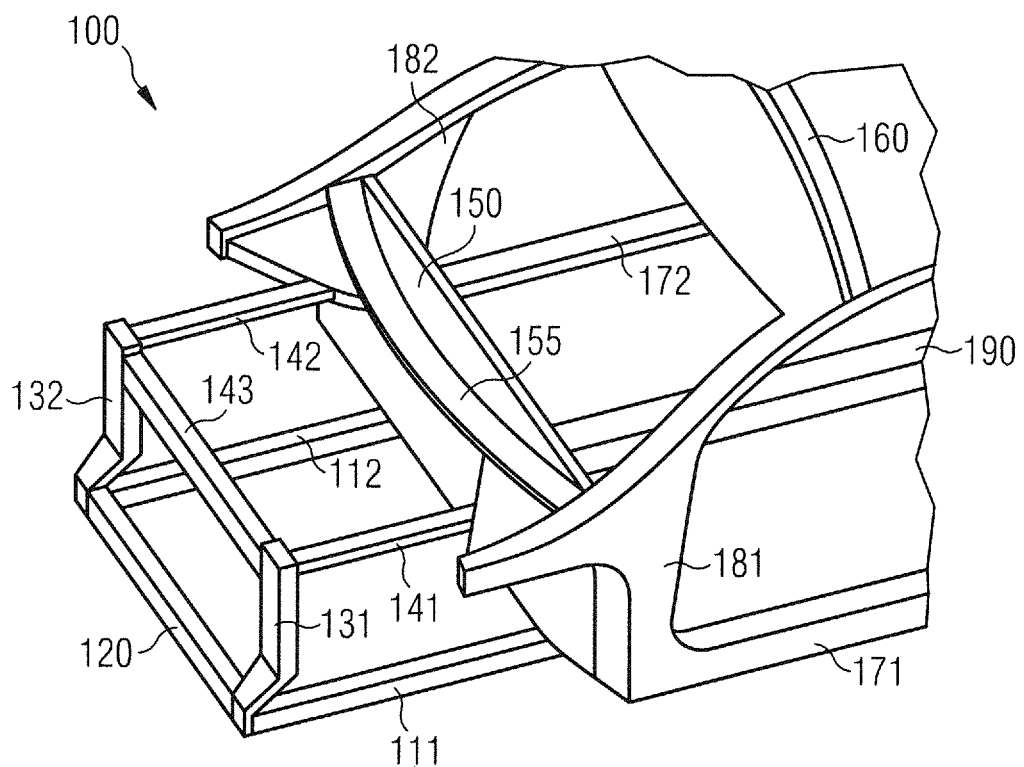
FIG. 1 is a perspective view of the front end of a motor vehicle body.

The front end 100 of a passenger motor vehicle body schematically illustrated without any constructive details in FIG. 1 has two longitudinal supports 111 and 112, which are connected at their forward ends by a forward transverse support 120. The longitudinal supports 111/112 and the forward transverse support 120 are particularly crash-relevant or crash-functional motor vehicle body components.

The front end 100 further includes two supporting carriers 131 and 132 as well as several upper support elements 141, 142 and 143.

In the illustrated example, the forward transverse support 120, the forward ends or sections of the longitudinal supports 111/112 and the two supporting carriers 131/132 form a vehicle body structure region, which, within the meaning of the invention, is a component assembly in which, in a supplementary fashion, additional components, such as the support elements 141/142/143, may also be included.

The illustrated cutout of the motor vehicle body also includes a front wall 150 having an upper front wall transverse support or windshield transverse support 155, several roof bows 160, two side skirts 171 and 172, two A-pillars 181 and 182 and a tunnel 190.

Figure 2:
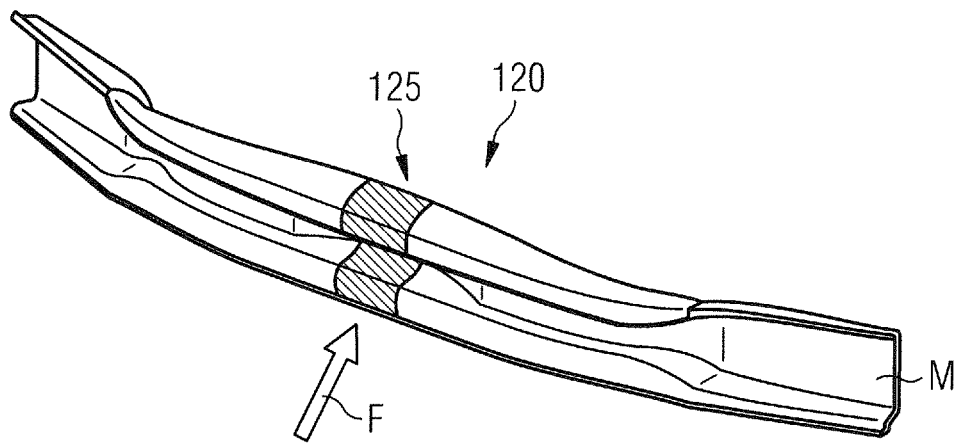
FIG. 2 is a perspective view of the forward transverse support of the front end of FIG. 1.

FIG. 2 illustrates a forward transverse support 120 designed as a press-hardened sheet metal part which, according to FIG. 1, is connected at its two ends with the longitudinal supports 111/112 and supporting carriers 131/132. This forward transverse support 120 has an overhardened component region or an overhardened zone 125, in which the steel sheet material M only has a very low ductility because of an overhardening which took place during the press-hardening, so that at this point, a tear and/or break will occur, as a result of a crash load (as shown, for example, by means of the arrow F). The overhardened component region 125 extends between the opposite longitudinal edges in a contiguous surface piece (or surface section), within which the sheet metal material M has a very high and substantially homogeneous strength. In an analogous manner, the transverse support 120 may have several overhardened component regions.

The component failure at the point predetermined by overhardening is intentional. As a result, the occurring collision energy can be deflected in a targeted manner into the adjacent longitudinal supports 111/112 and supporting carriers 131/132 and is forwarded by the latter, for example, into the support elements 141/142/143, and/or can be absorbed and reduced by the latter by deformation.

The longitudinal supports 111/112 and supporting carriers 131/132 may act quasi as energy absorption elements and are preferably constructed correspondingly, so that a defined deformation (i.e. deformation with predetermined deformation possibilities) is made possible. The support elements 141/142/143 may also act as energy absorption elements and be constructed correspondingly.

Analogously, other press-hardened vehicle body components, such as, for example, the front wall reinforcement or the front wall transverse support 155, may be constructed with overhardened regions or zones, which represent predetermined breaking points in the described fashion.

LIST OF REFERENCE SYMBOLS

100 Front end (motor vehicle body)
111 Longitudinal support
112 Longitudinal support
120 Transverse support
125 Overhardened component region, predetermined breaking point
131 Supporting carrier
132 Supporting carrier
141 Support element
142 Support element
143 Support element
150 Front wall
155 Front wall transverse support
160 Roof bow
171 Side skirt
172 Side skirt
181 A-pillar
182 A-pillar
190 Tunnel
F Crash load
M Steel sheet material The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle sheet metal component made of a press-hardened steel sheet material, comprising:
   at least one overhardened component region in the vehicle sheet metal component, wherein the at least one overhardened component region defines a predetermined breaking point in the vehicle sheet metal component in an event of the vehicle sheet metal component being subject to a crash load and wherein the vehicle sheet metal component is a transverse support of a motor vehicle,
   wherein the at least one overhardened component region is a region or surface section of the vehicle sheet metal component in which the press-hardened steel sheet material has a higher hardness and a lower ductility than other regions of the vehicle sheet metal component.

2. The vehicle sheet metal component according to claim 1, wherein
   outside the at least one overhardened component region, the steel sheet material has different strengths than a strength of the at least one overhardened component region.

3. The vehicle sheet metal component according to claim 1, wherein
   in the at least one overhardened component region, the steel sheet material has a strength that is at least by 100 MPa above the highest strength outside the at least one overhardened component region.

4. The vehicle sheet metal component according to claim 1, wherein
   in the at least one overhardened component region, the steel sheet material has a strength that is at least by 200 MPa above the highest strength outside the at least one overhardened component region.

5. The vehicle sheet metal component according to claim 1, wherein
   in the at least one overhardened component region, the steel sheet material has a strength that is at least by 300 MPa above the highest strength outside the at least one overhardened component region.

6. The vehicle sheet metal component according to claim 1, wherein
   in the at least one overhardened component region, the steel sheet material has a strength that is at least by 400 MPa above the highest strength outside the at least one overhardened component region.

7. The vehicle sheet metal component according to claim 1, wherein
   in the at least one overhardened component region, the steel sheet material has a strength of at least 1,600 MPa.

8. The vehicle sheet metal component according to claim 1, wherein
in the at least one overhardened component region, the steel sheet material has a strength of at least 1,700 MPa.

9. The vehicle sheet metal component according to claim 1, wherein
in the at least one overhardened component region, the steel sheet material has a strength of at least 1,800 MPa.

10. The vehicle sheet metal component according to claim 1, wherein
in the at least one overhardened component region, the steel sheet material has a strength of at least 1,900 MPa.

11. The vehicle sheet metal component according to claim 1, wherein
the at least one overhardened component region extends from an outer edge of the sheet metal component to at least one other outer edge of the sheet metal component.

12. The vehicle sheet metal component according to claim 1, wherein
the sheet metal component has a substantially homogeneous sheet metal thickness.

13. A component assembly for a motor vehicle body, comprising:
at least one press-hardened sheet metal component according to claim 1, wherein
in an event of being subject to a crash load, the at least one press-hardened sheet metal component is tearable and/or breakable in at least one overhardened component region in order to deflect collision energy in a targeted manner into one or more other components.

14. The component assembly according to claim 13, further comprising:
additional components joined with the at least one press-hardened sheet metal component, which include at least one of castings, sheet metal parts, profile parts or plastic composite parts.

15. A motor vehicle body for a passenger car, comprising:
at least one press-hardened sheet metal component according to claim 1; and/or
at least one component assembly, comprising:
at least one press-hardened sheet metal component, wherein
in an event of being subject to a crash load, the at least one press-hardened sheet metal component is tearable and/or breakable in at least one overhardened component region in order to deflect collision energy in a targeted manner into one or more other components.

16. The vehicle sheet metal component according to claim 1, wherein
the at least one overhardened component region has reduced ductility and/or increased embrittlement compared to the steel sheet material outside the at least one overhardened component region.

17. The vehicle sheet metal component according to claim 1, wherein
the at least one overhardened component region is generated by way of a cooling device of a press-hardening tool to produce the press-hardened steel sheet material.

18. A vehicle sheet metal component made of a press-hardened steel sheet material, comprising:
at least one overhardened component region which is provided to act as a predetermined breaking point in an event of being subject to a crash load, wherein
outside the at least one overhardened component region, the steel sheet material has a substantially homogeneous strength, which ranges from 1,300 MPa to 1,500 MPa.

19. The vehicle sheet metal component according to claim 18, wherein
outside the at least one overhardened component region, the steel sheet material has different strengths than a strength of the at least one overhardened component region.

* * * * *